Dec. 4, 1951 P. ORAZI 2,577,031
SLOW DESCENT DEVICE FOR AIRCRAFT
Filed Feb. 27, 1950 2 SHEETS—SHEET 1
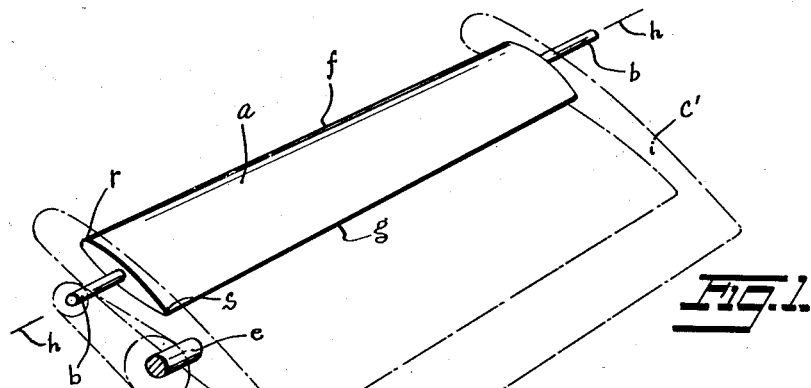
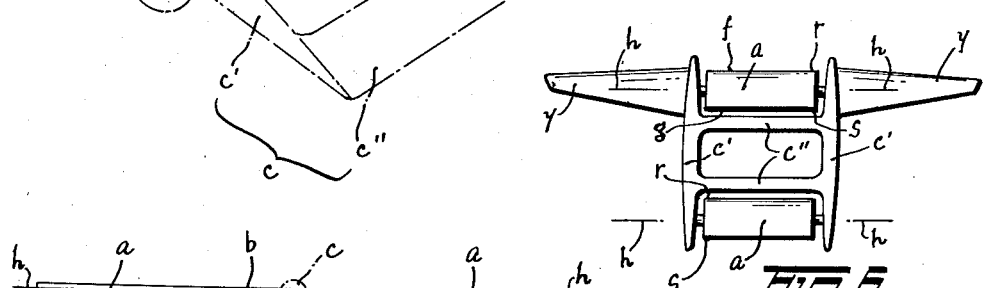
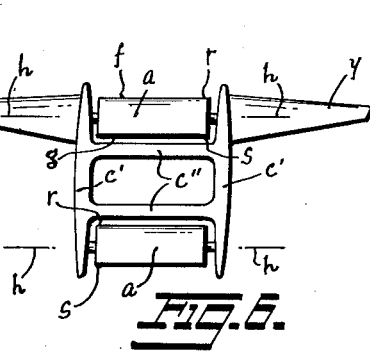
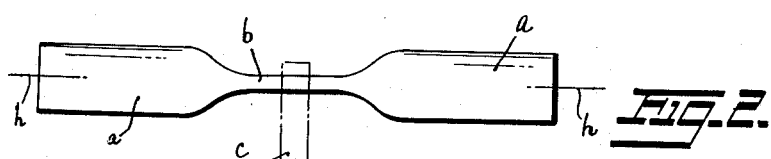
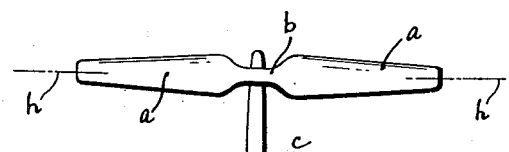
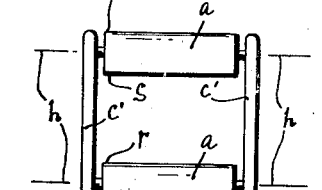
INVENTOR.
PAOLO ORAZI
BY
*ATTORNEY*

Dec. 4, 1951  P. ORAZI  2,577,031
SLOW DESCENT DEVICE FOR AIRCRAFT
Filed Feb. 27, 1950  2 SHEETS—SHEET 2
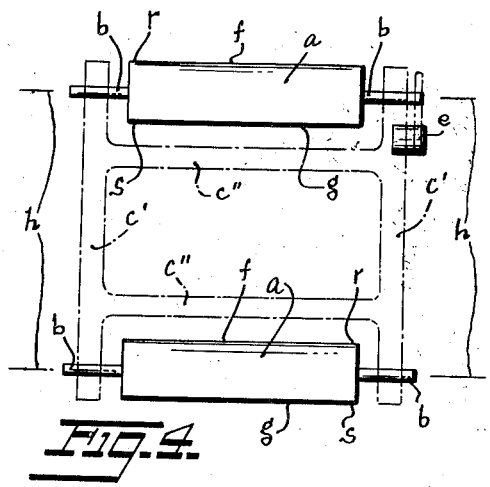
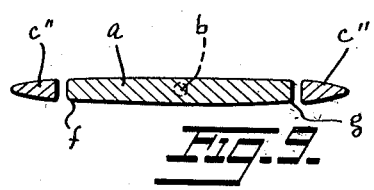
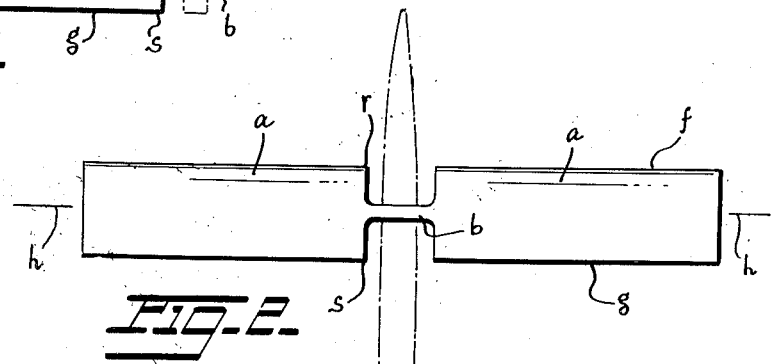
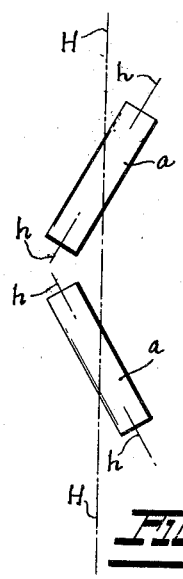
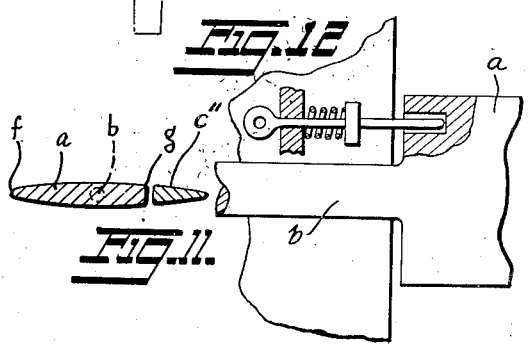
INVENTOR.
PAOLO ORAZI
BY
ATTORNEY

Patented Dec. 4, 1951

2,577,031

UNITED STATES PATENT OFFICE 2,577,031

SLOW DESCENT DEVICE FOR AIRCRAFT

Paolo Orazi, Brescia, Italy

Application February 27, 1950, Serial No. 146,414

5 Claims. (Cl. 244—139)

This invention relates to means for delaying the descent of freely falling member and has for its principal object to accomplish this through the auto-rotation of lift surfaces along their longitudinal axes. By the term auto-rotation I do not mean the conventional auto-rotation known in the autogyro and helicopter field but rather rotation about an axis which passes through the vertical section of a sustentation surface.

The systems used up till now for delaying a descent consist of the parachute, the auto-rotation of conventional rotors, the invertment of the propeller's pitch, or aerodynamic brakes.

A further object of the invention is to substitute said auto-rotation for the conventional aerodynamic brake or the usual means for increasing lift.

The conventional glider does not permit a slow yet steep descent, and the parachute is not operable at low altitude. Therefore, still another object of the invention is the provision of means whereby loads dropped from low altitudes are provided with a slow yet steep descent.

The principle of this invention involves the ability of certain surfaces to maintain, while failing, a rotation which has been imparted to them. Said principle allows generally a device having a slow rate of descent, and of simple mechanical realization.

A still further object of the invention is to provide not only a device built purposely to have a slow rate of descent in free fall but also to apply the principle involved to conventional aircraft or missiles.

It is contemplated that the device may permit the launching of special bombs to be exploded in the air and hit the target more precisely than by the present system because of the transformation of the horizontal flight of the device into a slow braked fall with a rather steep trajectory.

According to the invention the principle thereof can be applied to the landing of planes, helicopters with two two-bladed rotors in tandem, and so on. The principle is also applicable to flying missiles of the general V1 type for safely landing the same or for braking their flight.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective to illustrate the general principle of the invention. Said perspective represents also one embodiment of said principle.

Fig. 2 is a schematic plan view of a different embodiment of the said principle with parts analogous to those of Fig. 1.

Fig. 3 is a schematic front elevational view of Fig. 2.

Fig. 4 is a diagrammatic plan view of a machine with two surfaces according to the principle of the invention.

Fig. 5 represents a diagrammatic plan view of a machine with two surfaces, said machine being reduced to the most simple schematic.

Figs. 6, 7 and 8 represent plan views of embodiments of applications of the principle of the invention to airplanes, tandem helicopters and so on, and to flying missiles.

Figs. 9 and 11 are cross sectional outline views to show peculiar forms of the considered surface and of bodies forming a sustentation surface with aerodynamic airfoil.

Fig. 10 is a diagrammatic plan view showing an alteration in the disposition of the theoretical axis of the considered surface in the plan view of a wing.

Fig. 12 shows a releasable lock device of conventional construction for locking the airfoil surface against rotation.

In Fig. 1 there is shown a schematic perspective which illustrates generally the principle of the invention which however is not limited to the precise construction shown. The surface $a$ is similar to a sustentation surface or wing of rectangular outline in plan view and at the extremities of its longitudinal center of gravity (axis $h$) is pivoted to the arms $c'$ of a U-shaped member $c$ whose base portion $c''$ is integral with said arms. Surface $a$ therefore is free to rotate about axis $h$. Rotation of surface $a$ can be accomplished in a variety of ways but that about to be described is the preferred one. The surface $a$ has projecting from either extremity of axis $h$ a pivot stud $b$ which is journalled in a suitable bearing in the adjacent arm $c'$. The construction is such that the surface $a$ is free to rotate on its pivots $b$ but is fixed with regard to other movements relative to member $c$.

According to the invention the surface $a$ continues rotating on axis $h$ during the descent of the device. More particularly, when the device is being dropped and a rotative movement on axis $h$ is imparted to the surface $a$ said surface continues to rotate with axis $h$ parallel to the plane of the ground during the descent. Thus, the device glides steeply yet slowly toward the ground.

Generally the operation of the device is substantially identical for surfaces of different outlines. Further the trailing edges thereof may not be parallel to the leading edges.

If the surface is of general rectangular design with a suitable ratio between chord and span, the machine generally has such characteristics to provide regular descent even when dropped in any wind or at any speed and irrespective of the position in which it has been dropped. Thus, if the machine has been dropped in irregular position, that is, with the axis $h$ not parallel to the plane of the ground, the device with the proper said ratio tends to level out and descend regularly. Even in a design of the surface $a$ where the chord is equal to the span, or where the chord is very small with respect to the span, there is a tendency to auto-rotation, but such design usually is unsatisfactory. In the case if the chord is too small with respect to the span the device might tend to slip, describing a cone in the descent. Preferably the chord chosen is small in respect to the span so the number of revolutions is greater. In other words the auto-rotation is at a faster rate.

One of the simplest embodiments of the invention is the one shown in Fig. 2, which is a schematic plan view of the said embodiment. A bipartite surface $a$ having at its center a shaft-like portion $b$ extending along the general longitudinal axis $h$, has a member $c$, or the load, pivoted on portion $b$. Fig. 3 is a front elevational schematic view of the embodiment of Fig. 2. If an initial rotative motion be imparted to the shaft $b$ along axis $h$ at the moment of dropping the device, irrespective of the horizontal speed of flight at the moment of the launching and of the position of the device at said moment, the surface $a$ shortly assumes a position horizontal with the plane of the ground and glides steeply yet slowly to the ground, the load $c$ depending vertically therefrom. Inasmuch as there is no variation in the pitch of the two surfaces $a$ in the embodiment of Fig. 2, external means are needed to impart the said initial rotation thereto.

The device has the same flight and auto-rotation characteristics above described if the two blades of surface $a$ in Fig. 2 are rigidly pitched differently; in this form the said pitch acts to provide said initial rotation in place of the external mechanical means necessary in the previous form.

In Figs. 1, 2, 3, 4 and 5 the invention shown is embodied in a device adapted when falling freely to have a slow descent. It will be seen that a load could be applied to the part $c''$ of Fig. 1 but for this purpose the embodiment of the device shown diagrammatically in Fig. 4 is preferable. As described the device of Fig. 1, during its normal fall, descends with axis $h$ parallel to the plane of the ground, but the part $c''$ in the descent hangs vertically beneath axis $h$.

In the device shown in Fig. 4 the arms $c'$ are elongated and are connected by two cross bars $c''$ located toward their center in plan view. Two surfaces $a$ are pivoted to the arms $c'$, one at each end thereof, said surfaces having each the preferred ratio between chord and span to secure for the device the ability to descend as described above. An initial rotation having been imparted to the surfaces $a$ thereof, the device of Fig. 4 descends with the plane passing through the axes $h$ parallel to the plane of the ground.

As already mentioned the initial rotative motion should be imparted to the surfaces $a$ at the instant of dropping the device. After that the auto-rotation occurs and continues till the end of the fall. In order to avoid the fall of the device with the surface or the surfaces considered swaying on the longitudinal axis but not rotating, simple means are provided to impart the said initial motion. To this end a small spring or electric motor or other means such as a compressed air device $e$ is provided to impart to the shaft $b$ (Fig. 1) sufficient torque to cause the rotation for few revolutions of the surface $a$, said means then ceasing to act. An overrunning clutch may be included in the drive between motor $e$ and surface $a$ in the usual manner, to permit the surface to rotate after the motor has stopped. In Fig. 4 an analogous means to impart the initial motion of rotation to both surfaces $a$ at the moment of the dropping is provided. The direction in which the motion is imparted may be opposite for the two surfaces of the device of Fig. 4 when a vertical trajectory is wanted, but preferably the trajectory of descent is steep but not vertical and the surfaces are rotated in the same direction.

As the means shown in Figs. 1 to 5 can be dropped by a plane, it may be added, that in the case of the device of Fig. 4, the same may be fixed under, or into the fuselage of an airplane in such manner that the plane passing through the axes $h$ is parallel to the plane of the ground. In this way the device will already be in position for the normal descent at the moment of dropping. However, even if the position in which the device is fixed in the aircraft at the moment of the launching is not the preferred one, the device will easily acquire the position of normal fall, if the said means to impart the initial motion contemporaneously to the surface $a$ is utilized.

The device, after being dropped, describes a smooth curve of descent gliding at last with a steep linear trajectory, but maintaining always the normal horizontal position.

In the case of the device of Fig. 4 a device for landing not shown could be installed in order to smooth the contact with the ground in those instances in which the device is used to land loads. However, even when dropped from a low altitude the device does not have sharp contact with the ground, said slow descent starting immediately on dropping the device. Such landing device, however, is not necessary where the device is to be used for the explosion of bombs in the air, because then the device is destroyed.

It is to be pointed out that the device is ideally adapted to support bombs to be exploded in the air, which bombs heretofore were carried by parachutes. By launching of bombs to be exploded in the air with this device it is possible to position the bomb for its explosion much more accurately due to the known steep, gliding trajectory of the device than if the bomb is launched with a parachute. Thus more accurate, delayed drop bombing is possible with the device than has been known before.

The same advantage exists for the dropping of loads within a limited area. Further precision is also given by the ability of the device to be dropped from low altitudes.

Fig. 5 shows another embodiment of a device for the general purpose of permitting the slow descent of loads. The view is a diagrammatic plan view and the semi members or fuselages $c'$ are independent of each other. The pivoting of surfaces $a$ at the extremities thereof is analogous to the embodiment of Fig. 4 described above and the device operates in the same manner as that previously described one. The loads to be transported are placed in the interior of parts c' or attached to the same.

Another purpose of the invention is to apply the principle thereof to conventional planes or flying missiles. Figs. 6-8 illustrate embodiments for this purpose. In Fig. 6 there is illustrated an aircraft with two fuselages from which project wings y. Between the fuselages there are pivoted two surfaces a, the one forming a part of the wings y and the other, or rear one, a part of the horizontal empennage. Normally the surfaces a are fixed relative to the fuselages c' at points r and s (Figs. 1 and 6), but are adapted to be freed from such restraint and given an initial rotative movement when such is desired. Thus, almost vertical descent of the plane in horizontal position is rendered possible as well as great facility of such a machine to change from horizontal flight to almost vertical flight. It is to be mentioned that the principle generally holds irrespective of the form of the airfoil that is used. This is particularly advantageous because it allows great freedom in the design of aircraft to which the system of the invention has been applied.

Referring to Fig. 6 it is possible that the parts c" do not exist, the parts a are airfoils of the wing or the horizontal empennage of the airplane. But the principle of the invention is in force even where the surface a is an airfoil of a wing, because there is normal auto-rotation even when the anterior edge f and the posterior edge g are almost sharp rather than blunt, in such manner that when the part a of an aircraft is fixed for the horizontal flight by the locking means, said part forms together with the part c" a wing such as that shown in Fig. 9. The aircraft, whose sustentation surface airfoil section is shown in Fig. 9, is not shown in plan view. Referring to Fig. 6 the same thing can be done with the horizontal empennage. This invention is applicable also to other planes not shown such as flying wing planes, planes with swept back wings or planes with supersonic airfoils. In fact considering aircraft in plan view, the invention can be applied in various ways, for instance, by using for each conventional swept back wing of a plane a surface a whose axis h is not parallel with the longitudinal axis H of the wing shown in the diagram of Fig. 10.

Referring to Fig. 6 the parts a may have a section such as shown in Fig. 11 with the edge f round and the edge g sharper. This does not hamper the functioning of the device as described. And referring to Fig. 11, other changes may also be made.

The part a in the figure is located forward of the part c" but such order can be inverted, the part c" then having the form of a leading edge of a wing formed by parts c" and a, when part a is in its locked condition for airplane flight. The same modifications can be applied to the embodiment of Fig. 10, where part c" can be anterior, posterior or there may be parts c" both anterior and posterior. The described embodiment can as mentioned also be made easily in the case of supersonic airfoils. The considered embodiments in airplanes, act in general to do away with need for aerodynamic brakes or the usual means for increasing sustentation or the like.

Referring to Fig. 6 the surfaces a could be ordinary wings integral with the fuselages c', while each could be pivoted to the body c' to turn on their longitudinal axes h, said parts y then acting in the same way as described hereinbefore with reference to parts a. Here again it is recommended that the described motor e be used. Moreover it is to be mentioned that in some applications of the invention to planes, engine e would be made sufficiently strong to actuate continuously the surfaces a.

Fig. 7 shows the application of the invention to a tandem rotor plane, or to airplanes generally with simple fuselage. In such cases the surface a is pivoted to the fuselage at the center of the said surface according to the principle explained with reference to the embodiment of Fig. 2. The pivot should be firm enough not to permit other motions of the surface a relative to the fuselage. The locking system holds the surface a locked to the fuselage c in conventional position for the airplane flight.

The embodiment illustrated in Fig. 7 can be applied to tandem helicopters with two two-bladed rotors at nose and tail of the fuselage, the rather vertical landing thereof in horizontal position being achieved with the rotors locked in the positions shown in the drawing. The pitch of the blades does not affect the operation if each rotor is capable of rotation according to the principle of the invention.

The invention is also applicable to flying missiles for the purpose of saving missiles of the general V1 type during flight tests thereof, or for braking the flight of said missiles when desired. One application of the principle of the invention to simple or "side by side" flying missiles is (Fig. 8) for the surface a when locked to the missile to act as a sustentation surface therefor, and when unlocked and caused to rotate by a suitable engine e to ease the fall of the missile at the end of the flight test, rescuing the same. Also schemes analogous to those applied to planes in general can be applied to missiles. In the case of a flying missile such as shown in Fig. 8, said missile lands with the fuselage axis vertical, the surface a not being at the center of the fuselage. This embodiment is made on the principle of the embodiment of Figs. 2 and 3 already described; that is to say, the surfaces a are rigidly connected and are mounted in one body on the shaft b. All of the considerations relative to the substitution for the engine e of a difference of pitch of the surfaces according to the embodiment of Figs. 2 and 3, are applicable here.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a device of the class described a U-shaped member, an elongated sustentation surface pivoted at the extremities of its longitudinal axis to the arms of said member, the said surface being free to continuously rotate in one direction on its pivots but being fixed against other movements relative to said member, and a device normally locking the surface to the member to prevent rotation of the former, but operable to free said surface for such rotation.

2. In a device of the class described a U-shaped member, an elongated sustentation surface pivoted at the extremities of its longitudinal axis to the arms of said member, the said surface being free to continuously auto-rotate in one direction on its pivots but being fixed against other movements relative to said member; a device normally locking the surface to the member to prevent rotation of the former, and motor means for initiating auto-rotation of said surface.

3. An airplane having twin fuselages, a sustentation surface pivoted between said fuselages at the extremities of the longitudinal axis of said surface most conducive to auto-rotation thereof, wing members secured to the external sides of the fuselages in alignment with said surface; means for locking said sustentation surface to said fuselages whereby the wing members and said sustentation surface form a conventional wing; and a compressed air device for starting auto-rotation of said surface in the inoperative position of said lock means.

4. An airplane having a fuselage, a pair of elongated sustentation surfaces pivoted each at one extremity of its longitudinal axis to said fuselage; means for locking said sustentation surfaces to said fuselage to form conventional fixed wings, and means for starting auto-rotation of said surfaces about their longitudinal axes in the inoperative position of said lock means.

5. An airplane or the like having a fuselage, an elongated sustentation surface rotatively mounted at the center of its longitudinal axis most conducive to continuous auto-rotation in one direction, means to lock said surface to said fuselage whereby said surface acts as a fixed wing, and motor means for effecting auto-rotation of said surface.

PAOLO ORAZI.

REFERENCES CITED

The following references are of record in the file of this patent:

UNITED STATES PATENTS

| Number | Name | Date |
|---|---|---|
| 2,107,808 | Van Ittersum | Feb. 8, 1938 |
| 2,439,206 | Farr | Apr. 6, 1948 |

FOREIGN PATENTS

| Number | Country | Date |
|---|---|---|
| 17,981 | Great Britain | 1915 |
| 387,899 | Great Britain | Feb. 16, 1933 |